United States Patent [19]

Vostovich

[11] 4,419,475

[45] * Dec. 6, 1983

[54] HEAT RESISTANT ETHYLENE-PROPYLENE RUBBER WITH IMPROVED TENSILE PROPERTIES AND INSULATED CONDUCTOR PRODUCT THEREOF

[75] Inventor: Joseph E. Vostovich, Bridgeport, Conn.

[73] Assignee: General Electric Company, Schenectady, N.Y.

[ * ] Notice: The portion of the term of this patent subsequent to Dec. 1, 1998 has been disclaimed.

[21] Appl. No.: 289,611

[22] Filed: Aug. 3, 1981

Related U.S. Application Data

[60] Division of Ser. No. 208,725, Nov. 20, 1980, Pat. No. 4,303,574, which is a continuation of Ser. No. 50,036, Jun. 19, 1979, abandoned.

[51] Int. Cl.[3] .......... C08K 5/54

[52] U.S. Cl. .......... 524/264; 524/409; 524/451; 428/389; 428/390; 428/391

[58] Field of Search .......... 524/264, 409, 451; 428/389, 390, 391

[56] References Cited

U.S. PATENT DOCUMENTS

| | | | |
|---|---|---|---|
| 2,888,424 | 5/1959 | Precopio et al. | 260/41 |
| 3,079,370 | 2/1963 | Precopio et al. | 260/94.9 |
| 3,214,422 | 10/1965 | Mageli et al. | 260/94.9 |
| 4,069,190 | 1/1978 | Vostovich | 260/31.8 M |
| 4,125,509 | 11/1978 | Vostovich | 260/33.6 |
| 4,133,936 | 1/1979 | Vostovich | 428/389 |
| 4,145,475 | 3/1979 | Vostovich | 428/389 |
| 4,303,574 | 12/1981 | Vostovich | 524/264 |

OTHER PUBLICATIONS

Goodyear Chemicals, "Handbook on Antioxidants and Antiozonants," pp. 1-36.

Vaidyn, "Flame Retarded Integral Insulation Jacket Compositions with Excellent Heat Resistance and Electrical Stability," presented at ACS Rubber Division, Oct. 12, 1978, Boston, Mass. Contribution No. 352.

Mobay Chemical Corporation Product Brochure re Vulkanox ZMB-2.

*Primary Examiner*—Melvyn I. Marquis
*Attorney, Agent, or Firm*—Paul E. Rochford

[57] ABSTRACT

A cross-link curable ethylene-propylene rubber composition with improved tensile and related properties and resistance to heat, the cured rubber composition and electrical conductors indulated with said cured rubber composition. The improved rubber composition comprises a combination of ethylene-propylene rubber, chlorosulfonated polyethylene, finyl silane, antimony oxide, peroxide and a combination of antioxidants, zinc oxide, talc and carbon black in particular proportions.

6 Claims, 1 Drawing Figure

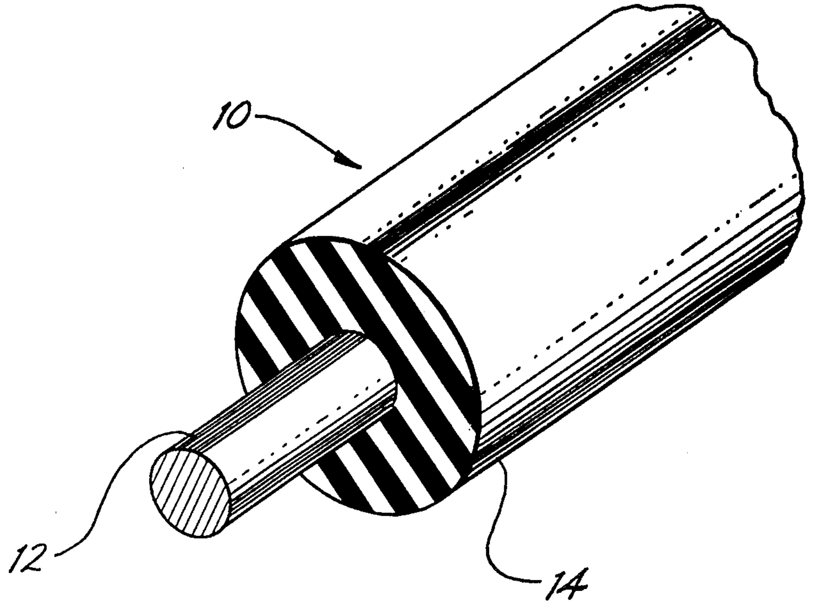
10
12
14

HEAT RESISTANT ETHYLENE-PROPYLENE RUBBER WITH IMPROVED TENSILE PROPERTIES AND INSULATED CONDUCTOR PRODUCT THEREOF

This application is a division of application Ser. No. 208,725, filed Nov. 20 1980, now U.S. Pat. No. 4,303,574 which application is a continuation of application Ser. No. 50,036, filed June 19, 1979, now abandoned.

BACKGROUND OF THE INVENTION

The present invention relates generally to compositions of ethylene-propylene rubber adapted for use as insulation compositions and to conductors insulated with such compositions. More specifically the invention relates to an ethylene-propylene composition having a desired and needed combination of properties as an insulator including improved tensile properties in combination with heat resistant properties and to insulated conductors having such composition forming the insulation thereof.

It is well known that polymeric compositions, when used for insulating purposes, are used in many different environments including temperature environments, and that no one composition is suitable for all uses. To a large degree the use, which is made of an insulating composition, places important requirements on the composition and there are many standards which have been established in the industry, and by standards organizations such as the Underwriters Laboratories, ASTM, IPCEA, for wire insulaton compositions. In all of the standards which are established there is a close correlation between the requirements of the insulated composition and of the insulated wire of cable and the use to which the composition or cable is to be put. Accordingly, it is well-established in the wire and cable technology and industry that different combination of insulating properties and physical properties are required in different cables where such cables are to be used in applications having particular criteria such as temperature criteria, atmospheric criteria, voltage criteria and other measurable criteria of compositions and of cables.

Another important criteria of insulating compositions, and of cables formed with such compositions, is the economic criteria or more specifically the ability to prepare such compositions and cables at reasonable costs.

In some other cases a composition can be prepared in a bulk form, or an extruded form, or a sheet forms and have good properties but the same properties are not retained when a product is put on a conductor to form a wire or cable. For still other compositions the process by which the material is applied to a conductor may give deleterious results in the finished product or may make the application process uneconomical.

Compositions which have been prepared in the past of ethylene-propylene rubber and which have very desirable heat resistance and other properties for use as wire and cable insulation are disclosed in U.S. Pat. Nos. 4,069,190 and 4,133,936, both patents being assigned to the same assignee as the subject application. As is brought out in these patents the insulating composition and the cable made with the insulating composition has a combination of properties, values of which are set forth in the data included in the patents. Further, the composition is made up of a number of ingredients which are set forth in range values also explicity included in the data of the preferred embodiments.

One of the desirable properties which is achieved in the compositions and products of the patents referenced above is heat resistance.

In developing the composition, the heat resistance needed was not as great as that of silicone rubbers which had been used in prior compositions but the overall combination of properties including heat resistance was achieved at a cost substantially below the silicone rubbers. In other words the new compositions of the reference patents were substituted for silicone rubber compositions previously employed as heat resistant wire insulation compositions.

One of the criteria in achieving heat resistance as is brought out in the patents is the avoidance of cracking and deterioration of the composition when employed at the elevated temperatures. The heat resistant properties of the composition of the reference patents are attributed to a number of factors. In this regard it is important to appreciate that a composition made up of such a combination of materials achieves a combination of properties based on the proper blending and curing of the components as prescribed in the patent. With regard to the heat resistant properties one of the elements or components which contributes to the development of the heat resistant property, but not the only component, is the inclusion of the antioxidants in the overall combination in the ranges set forth in the reference patents. Other components are deemed significant in achieving the overall beneficial combination of properties of the composition both by itself and also as a wire insulation. However, with reference to the antioxidant the combination of ingredients includes the antioxidant which is present in order to inhibit such reactions at elevated temperatures as cause deterioration of the composition and product. As is evident from the text of the prior art patents, there is also present in the overall composition a peroxide material which is added according to the prescribed method to provide the cross-linking as set out in the patent. Such cross-linking gives the compositions of the reference patents some of their higher temperature properties. It has generally been understood with respect to higher temperature compositions formed by peroxide curing that the presence of the peroxide and the presence of the antioxidant material can be antagonistic to each other in the sense that their functions in the overall composition are for inconsistent purposes. More specifically the peroxide material is present to induce cross-linking. By contrast the antioxidant material is present as generally contemplated to limit or inhibit the post-cured oxidation of the composition at the elevated temperatures at which it is used.

With reference to U.S. Pat. Nos. 4,069,190 and 4,133,936 the compositions and products are referred to as heat resistant and this heat resistance is indicated in the statement of the background of the invention to pertain to the loss of elasticity or to increase embrittlement upon exposure to temperatures above ambient temperatures. As stated in the patent. "The deteriorating efforts and the use of a variety of remiedal measures to improve their resistance to heat, such as the development and use of antioxidant or agents which block the action of oxygen or free radical forming ingredients, and new compound formulatons."

It is well known that different applications for wires require that the wires have different sets of properties depending on the application to be made of the wire.

For motor lead and apparatus lead applications the particular combination of properties which is required include a basic heat resistance of the insulation compound. For such applications a preferred combination includes an economical heat resistant, tough, flexible insulation with a moderate tensile strength and also with good tear resistance and good abrasion resistance. For such motor lead and apparatus lead applications the insulation jacket is integral in the sense that there is no outer jacket applied over the insulation jacket having these properties. In other words there is only a single insulating jacket applied and that jacket is the one which must have the desirable combination of properties recited above. Of course, the composition must also have a needed or standard set of electrical properties.

In general heat resistant properties of polymers may be increased by cross-linking of the polymer molecules. Such cross-linking can be accomplished for some polymer sytems by use of thermally unstable peroxide compositions. However the aging properties of polymer systems at high temperature may be adversely affected by presence of peroxide curing agents and antioxidant compositions have been added to polymer systems to inhibit or overcome such deleterius effects.

Mechanisms for antioxidant use are discussed in the following exerpt from a booklet entitled "Handbook On Antioxidant and Antiozonants" for rubber and rubber like products published by Goodyear Chemicals. Two exerpts from page 11 of the booklet are as follows:

"By adding an antioxidant of one or more types, the oxidation of polymers can be interrupted and the degradation slowed down considerably. There are two ways this can usually be accomplished. The first way is to introduce an antioxidant that will eliminate peroxides before they can do damage.

$$ROO^{\circ}+AH \rightarrow ROOH+A^{\circ}$$

$$ROO^{\circ}+A^{\circ} \rightarrow ROOA$$

The antioxidants which will do this are the phenolics and the aromatic amines. The amines include most of the staining antioxidants and the antiozonants."

"Another way of disrupting the oxidative action is to destroy the hydroperoxides before then can cause problems.

$$ROOH+AH \rightarrow \text{Stable Products}$$

Two types of antioxidants do this. They are the phosphites and the thioesters. The most common phosphite is trisnoylphenylphosphite and a well known thiester is dilaurylthiodipropionate, frequently called simply . . . DLTDP.

The thioesters are most widely used in plastics, principally polyolefins, while the phosphites are used in the rubber industry almost exclusively as emulsion polymer stabilizers. Both phosphite and thioesters are affected by vulcanization systems, losing most of their activity. Often an antioxidant from each of the two groups is used in a polymer to form a synegistic combination. By combining the two, they can work hand in hand to destroy both types of destructive radicals.

Actually, such a combination almost always works much better than simply increasing the concentration of a single antioxidant."

OBJECTS OF THE INVENTION

It is accordingly one object of the present invention to provide a wire product suitable for use as a motor lead or apparatus lead wire.

Another object is to provide an improved insulation composition for disposition and curing on a conductor to form a motor lead type of wire.

Another object is to provide an improved cured insulation composition for use on motor lead type conductors.

Another object is to provide a novel rubber composition having a novel combination of properties including a resistance to deterioration of such properties at high temperatures.

It is another object of this invention to provide a novel curable composition and products thereof which have an improved combination of properties for use in higher temperature insulation applications and which when cured have a desirable combination of physical and electrical properties.

It is another object of this invention to provide a new and improved electrical conductor having an insulation with a novel combination of physical properties and having apt electrical properties.

It is another object of this invention to provide an ethylene-propylene rubber composition possessing an novel combination of physical properties which make it particularly suitable for use as an electrical insulation for motor lead type conductors.

Other objects and advantages of the invention will be in part pointed out and in part apparent from the description which follows.

SUMMARY OF THE INVENTION

The invention comprises a novel rubber composition of a specific combination of compounded ingredients and proportions thereof which has a significantly improved combination of physical properties for use as an insulation of motor lead type of wire together with satisfactory other physical and electrical properties. The novel rubber composition of this invention is composed of an essential combination of ethylene-propylene rubber, chlorosulfonated polyethylene, zinc oxide, talc, carbon black, vinyl silane, antimony oxide, amine antioxidant, imidazole antioxidant, peroxide curing agent and curing coagent, and can include other optional components which enhance the overall attributes of the rubber composition. The invention additionally includes electrical conductors insulated with the novel ethylene-propylene rubber compound.

BRIEF DESCRIPTION OF THE DRAWING

The FIGURE comprises a perspective view of a section of an electrical conductor insulated with the novel and improved rubber composition of this invention.

DETAILED DESCRIPTION OF A PREFERRED EMBODIMENT

This invention specifically consists of a novel combination of compounded ingredients and relative proportions thereof which in total produce an elastomeric composition having an outstanding combination of physical and electrical properties including stability and resistance to deterioration upon subjection to elevated temperatures over extended periods suitable for use in a motor lead or apparatus lead wire.

The rubber composition of this invention comprises the combination, in approximate parts by weight, consisting essentially of:

| | |
|---|---|
| Ethylene-propylene rubber | 100 |
| Chlorosulfonated polyethylene | 3-10 |
| Zinc Oxide | 15-30 |
| Talc | 50-125 |
| Vinyl silane | 0.5-3 |
| Carbon black | 10-32 |
| Antimony oxide | 3-10 |
| Amine antioxidant | 1-4 |
| Imidazole antioxidant | 0.2-4 |
| Peroxide curing agent | 2-8 |
| Curing coagent | 2-5 |

The ethylene-propylene rubber component comprises ethylene-propylene copolymers and terpolymers of typical commercially available compositions constituting about 25 to about 75 parts by weight of ethylene monomer copolymerized with about 75 to about 25 parts by weight of propylene monomer. Terpolymers of ethylene-propylene include those commercial rubbers produced by the copolymerization of ethylene and propylene together with minor proportions of dienes such as ethylidene norbornene, dicyclopentadiene and 1,4-hexadiene.

Talc, of course, consists of a well-known but distinctive mineral form of hydrated magnesium silicate. It is preferred that the tacl component of this invention be of the plate type in its physical form.

In practicing this invention two special categories of antioxidant must be employed in combination to achieve the combination of desired physical and electrical properties in insulation material of the invention. The first category is the amine antioxidants and this category is exemplified by reaction products of diphenyl amine and acetone. The second category is the imidazole antioxidants and this category is exemplified by a zinc salt of 2-mercaptotolylimidazole.

Peroxide cross-link curing agents for the ethylene propylene rubber compound of this invention comprises the free radical forming organic peroxides such as tertiary peroxides characterized by at least one unit of the structure.

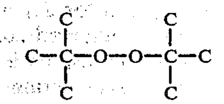

which is activated by its decomposition at temperatures in excess of about 295° F. The use of such peroxides in cross-linking polymers is described in detail in U.S. Pat. Nos. 2,888,424; 3,079,370; and 3,214,422. A commonly used and preferred curing agent for this invention is dicumyl peroxide.

The use of a peroxide curing coagent in the cross-linking of the novel composition of this invention is required to increase the efficiency of the cure in accordance with the technology in this art. Apt curing coagents include, for example, polybutadiene homopolymer.

The following comprise examples illustrating specific embodiments of this invention and demonstrating their improved combination of properties in relation to a control comprising a prior art composition.

The compounds of the control and each example of this invention were all prepared in an identical manner, comprising first admixing all components, except the peroxide curing agent and curing coagent, in a Banbury for about 10 minutes while heating to about 300° F. After cooling to room temperature, the curing coagent was added to the admixture on a two roll rubber mill. This was followed by the addit on of the peroxide by dispersal through the other ingredients.

The following comprise examples illustrating specific embodiments of this invention in relation to control compositions and illustrating by comparison of the embodiments with the control examples the benefits and advantages made possible through the invention. The improvements which are made are not confined to improvement of a single property and accordingly cannot be measured by a single criteria of the composition or cable. Rather, the improvements involve beneficial changes in a combination of properties and particularly those combinations which are needed and beneficial for the favorable performance of the composition and cable in the use applications for which they are prepared. One such common use of these materials and cables is in the motor lead and apparatus lead applications where cables prepared pursuant to this invention have shown superior performance and have solved some of the problems which are particularly associated with such end application use.

The compounds of the control examples listed in Tables I, II, and III and of each listed test example of this invention are all prepared in an essentially identical manner. The preparation involved first admixing all of the components except the peroxide curing agent and the curing coagent in a Banbury mill for about ten minutes while heating to about 300° F. After cooling to room temperature, a curing coagent was added to the admixture on a two roll rubber mill followed by the addition of the peroxide. The addition was made so as to disperse the coagent and the peroxide through the other ingredients.

A first set of test and control compositions was made and the combination of the ingredients of these compositions and some of the test properties formed are listed in the following chart identified as Table I.

All amounts are given in parts per 100 parts of base copolymer and/or terpolymer.

TABLE I

| | (Control) 1852 -19-07 Parts | (Unsuccessful Test) ID80 -87A Parts | (Unsuccessful Test) ID80 -87B Parts | (Successful Example) ID80 -87C Parts |
|---|---|---|---|---|
| Ethylene-propylene copolymer Exxon, Vistalon 404 | 50. | 25. | 50. | 50. |
| Ethylene-propylene-diene-terpolymer du Pont, Nordel 1040 | 50. | 75. | 50. | 50. |

TABLE I-continued

| | (Control) 1852 -19-07 Parts | (Unsuccessful Test) ID80 -87A Parts | (Unsuccessful Test) ID80 -87B Parts | (Successful Example) ID80 -87C Parts |
|---|---|---|---|---|
| Talc-hydrated magnesium silicate Sierra Talc, Mistron Vapor | 76. | 76. | 76. | 76. |
| Vinyl Silane | .77 | .77 | .77 | .77 |
| Thermal Carbon Black, R. T. Vanderbilt, Thermax(N991)Black | 30.4 | 30.4 | 30.4 | 30.4 |
| Reaction product of acetone and diphenylamine, Uniroyal, B.L.E. -25 | 2. | 2. | 2. | 1. |
| Zinc salt of 2-mercaptotolylimidazole Mobay, Vulkanox ZMB-2 | — | — | — | 2. |
| Chlorosulfonated polyethylene du Pont, Hypalon 40 | 5. | 5. | 5. | 5. |
| Antimony Trioxide | 5. | 5. | 5. | 5. |
| Zinc Oxide | 20.8 | 20.8 | 20.8 | 20.8 |
| Dicumyl peroxide curing agent 90–93% active Hercules, Di Cup T | 4.52 | 4.52 | — | — |
| Dicumyl peroxide curing agent 98–100% active Hercules, Di Cup R | — | — | 4.28 | 4.71 |
| Polybutadiene homopolymer Colorado Specialties, Ricon 150 | 3. | 3. | 3. | 3. |
| Press Cure: 45 min. @ 350° F. | | | | |
| Tensile Strength, psi | 787 | 721 | 781 | 1171 |
| Elongation, % | 573 | 423 | 502 | 278 |
| 200% Modulus, psi | 502 | 492 | 518 | 1063 |
| 18 Hrs. Air Oven @ 200° C. | | | | |
| Ends of 4" × ½" strip bent together | Slight Cracks at → edges | → | → | No cracks |

Samples of each composition of the controls and of the test examples of this invention were prepared from the Banbury into sheet form having a thickness of approximately ¼" although the thickness is not critical in relation to the properties of the material which result from processing of the sheet material. The only requirement is that the thickness of the sheet material be greater than the thickness of a platen in which the sheet is to be pressed at an elevated temperature. A quantity of the sheet material is cut and weighed and it is then placed in a heated platen having width and length dimensions greater than that of the sample of cut sheet material but which has thickness dimensions thinner than that of the cut sample of sheet material.

The platen is preheated at the time of introduction of the cut sample to a temperature of 350° F. The platen is premounted in a press which is then closed to apply a pressure to the composition and to at least partially cure the composition, to exclude air from the composition and to compact it to a final thickness of approximately 80 or 85 mils and a pressure across the members of the platen of approx. 4000–5000 psi. The total time during which the sample remains under pressure in the platen at 350° F. temperature is 45 minutes.

The platen press is opened to release and remove the pressed sample. The prepared test sample is allowed to cool to room temperature. Normally a waiting period of at least four hours follows the press heat curing of the composition in the platen before the physical tests are performed. The three physical properties, namely tensile strength, percent elongation and 200% modulus, are measured in the units as indicated in Table I. The measurements were made for the cross-link cured composition of each control and of the test samiple.

With regard to the results reported in Table I it is evident that there was also an accelerated heat aging test conducted for 18 hours in an air oven at 200° C. In this test the ends of a 4"×½" strip which had been subjected to the heat aging test were bent together. The measured values obtained were as set out in Table I. From the data which is presented in Table I, it is clear that strikingly different physical property values were obtained for the example ID 80-87C as compared to those obtained for the other test samples. Sample ID 80-87C is the only one of the four test samples listed in Table I which contain Vulkanox ZMB-2 in addition to B.L.E.-25 antioxidant material.

With further regard to the results presented in Table I, it will be realized that one of the principle problems which was being addressed in undertaking the studies, the results of which are reported in Table I, was the problem of improving the tensile strength and related properties of the resulting cured composition. The tensile strength properties tested are really those which refer to the tensile strength property of the insulation for use on a wire, such as a motor lead wire. The insulation composition is prepared for deposition as an insulating layer on a wire as an uncured composition. After deposit on the wire the composition is cured.

Experience prior to this invention has shown that there are numerous compositions for use or cure and that such prior art compositions had a highly desirable set of properties as an insulation for motor lead wire or for similar applications. However, it has also been known that the combination of properties desirable for such applications might be improved with particular regard to the tensile strength and related properties of the insulation. Referring to Table I and comparing the results of the tests of the properties of the compositions reported, an attempt was made to improve the tensile strength by increasing the amount of the terpolymer present so that the amount of the EPDM rubber and particularly the Nordel 1040 was increased by 25 parts with a concomitant decrease in the Vistalon copolymer of 25 parts. The results of the test ID 80-87A which had the higher concentration of terpolymer show that the tensile property was not improved and also that there was no improvement in the modulus. Accordingly this approach toward improving the tensile strength property was essentially unsuccessful. It will be noted that the other components of the ID 80-87A composition are identical with those of the control 1852-19-07.

With regard to the test sample ID 80-87B it is noted from Table I that the Vistalon, Nordel and other ingredients are the same as those given for the control 1852-19-07 but that a change was made in the peroxide employed from the Di Cup T to Di Cup R. The amount of Di Cup R used in 87B is slightly less than the amount of Di Cup T used in 87A. However because of the higher active level of dicumyl peroxide available from Di Cup R the dicumyl peroxide content of each composition is about equal. The use of Di Cup R was tested to determine whether the dicumyl peroxide present would be more effective in generating a higher degree of cross-linking because of the ease of processing to a homogeneous mix using the Di Cup R. However no difference in effectiveness was found.

Turning now to example ID 80-87C the ingredients of this test example were essentially the same as those of employed. In this polymer system the cross-linking agent is the peroxide and not the antioxidant. What is surprising is the finding that an increase in antioxidant coupled with a modification in antioxidant content apparently gave rise to a substantial increase in cross-linking as evidenced by the increase in the tensile strength and tensile strength related properties.

In fact, in run ID 80-87C the peroxide had been increased and further samples were prepared to test whether the increased tensile strength found should be attributed to the peroxide or to the modification of antioxidant or possibly to both.

A second set of trial runs were made by preparing both control and novel compositions and by testing them using the procedures and the format which has been described with reference to the compositions and their preparation and testing as set out with reference to Table I.

The results achieved in such tests are listed in Table II beneath the compositions which were tested.

Here again the amounts of the ingredients of the composition are given in parts per 100 parts of base polymer.

TABLE II

| | (Control) 1852 -19-07 Parts | ID80 -87C Parts | ID80 -90A Parts | ID80 -90B Parts | ID80 -90C Parts | ID80 -90D Parts |
|---|---|---|---|---|---|---|
| Ethylene-propylene copolymer Exxon, Vistalon 404 | 50. | 50. | 50. | 50. | 50. | 50. |
| Ethylene-propylene-diene-terpolymer du Pont, Nordel 1040 | 50. | 50. | 50. | 50. | 50. | 50. |
| Talc-hydrated magnesium silicate Sierra Talc, Mistron Vapor | 76. | 76. | 76. | 76. | 76. | 76. |
| Vinyl Silane | .77 | .77 | .77 | .77 | .77 | .77 |
| Thermal Carbon Black R. T. Vanderbilt, Thermax(N991)Black | 30.4 | 30.4 | 30.4 | 30.4 | 30.4 | 30.4 |
| Reaction product of acetone and diphenylamine, Uniroyal, B.L.E. -25 | 2. | 1. | 1. | 1. | 1. | 2. |
| Zinc salt of 2-mercaptotolylimidazole Mobay, Vulkanox ZMB-2 | — | 2. | 2. | 1. | 1. | .5 |
| Chlorosulfonated polyethylene du Pont, Hypalon 40 | 5. | 5. | 5. | 5. | 5. | 5. |
| Antimony Trioxide | 5. | 5. | 5. | 5. | 5. | 5. |
| Zinc Oxide | 20.8 | 20.8 | 20.8 | 20.8 | 20.8 | 20.8 |
| Dicumyl peroxide curing agent 90–93% active Hercules, Di Cup T | 4.52 | — | — | — | — | — |
| Dicumyl peroxide curing agent 98–100% active Hercules, Di Cup R | — | 4.71 | 4.28 | 4.71 | 4.28 | 4.71 |
| Polybutadiene homopolymer Colorado Specialties, Ricon 150 | 3. | 3 | 3. | 3. | 3. | 3. |
| Press Cure: 45 min. @ 350° F. | | | | | | |
| Tensile Strength, psi | 866 | 1394 | 1259 | 1197 | 1220 | 1151 |
| Elongation, % | 730 | 306 | 313 | 414 | 402 | 484 |
| 200% Modulus, psi | 532 | 1205 | 1106 | 937 | 966 | 853 |
| Tear Test lbs/in (A.S.T.M.-D 470) | 50.85 | 21.70 | 22.96 | 30.43 | 25.86 | 33.43 |

ID 80-87B with the exception that there was an increase in the amount of Di Cup R employed but also there was a substantial increase in the amount and composition of the antioxidant which was employed. The results in Table I show a very substantial increase in both tensile strength and modulus for the ID 80-87C test example. In fact, the degree of increase was quite surprising and unexpected, particularly inasmuch as the addition of the particular antioxidant material had the surprising apparent effect of increasing the degree of cross-linking of the ethylene propylene material of the base composition. In other words, improvements in the tensile properties are normally associated with increases in the cross-linking and increases in the cross-linking are normally associated with increases in the amount of cross-linking agent It is noteworthy first that the control sample of Table I, namely 1852-19-07 was repeated in making the runs for evaluation of compostions as carried out with reference to the tests and test results listed under Table II.

In this regard please note that although the components of the composition were essentially identical for the control sample of Table I and the control sample of Table II nevertheless there are somewhat different test results obtained from the measurements of physical properties. Thus, the tensile strength of the control sample of Table II was 866 psi while that of Table I was 787 psi. Similarly the elongation of Table II was 730% whereas that of Table I was 573%. Further, the modulus of Table II was 532 psi while that of Table I is 502 psi. It should be understood that in running tests of this sort different values will be obtained in the test results due to slight variations in some of the variables of processing or of the mixing or of the testing. The tested property value numbers of the control sample of Table II are deemed to be entirely compatible and consistent with the values found for the control of Table I. However, what is quite remarkable and striking are the very large differences which are found in the comparison of the test values of the physical properties of the control sample of Table II and the test values for the physical properties measured for the other test samples of Table II.

Turning now more specifically to the illustrative examples of Table II, the compositions are as set forth in the Table and are described here principally with reference to the differences rather than to recitation of all of the components which were employed in the sample. Please note that in the test ID 80-87C of Table II, two parts of Vulkanox ZMB-2 antioxidant were employed together with one art of B.L.E. -25 antioxidant. The same ratios of Vulkanox ZMB-2 and the B.L.E. -25 are employed in the example ID 80-90A and the only difference in composition is in the slightly different peroxide content. With reference specifically to the peroxide the purpose of using 4.71 parts of Di Cup R in example ID 80-87C is to increase the amount of peroxide employed in a manner and in an amount identical to the increase of peroxide employed in the example ID 80-87C of Table I. In fact, the compositions of the two ID 80-87C examples are identical for the test of Table I and the test of Table II. However, to demonstrate that the improved results in physical properties of the ID 80-87C sample was not the result of increase in peroxide over the other samples of Table I the peroxide content of samples of Table II was reduced to a level which approximates that of the control, namely 1852 -19-07 of both Table I and Table II. As is evident from the reading of the tensile strength elongation and modulus given in Table II, the improvement in properties of the novel composition of this invention is not the result of a modification of the concentration of peroxide alone. This last reference is of course to the example ID 80-90A as shown in Table II inasmuch as the peroxide content of example ID 80-90A of Table II corresponds closely to that of the control of Table I and Table II, namely 1852 -19-07.

Considering next the examples ID 80-90B and ID 80-90C, it is evident that these two examples employ a smaller amount of Vulkanox ZMB-2 than the two previous examples, namely ID 80-87C and ID 80-90A. However, as is evident from the results of the measurements of the tensile strength, elongation and modulus the values obtained for measurement of these physical properties are very substantially improved over those of the control 1852 -19-07. Further, there is a demonstration of the relatively low or insignificant effect of the change of peroxide concentration as between the ID 80-90B and ID 80-90C examples. This confirms again the results recited above with reference to the ID 80-87C and ID 80-90A examples concerning peroxide concentration. Accordingly it is clear that the improvement in physical properties is the result of the inclusion of the imidazole antioxidant in the composition together with the amine antioxidant and not a change in peroxide or peroxide concentration.

Considering next the ID 80-90D example, this is precisely the composition which was employed in examples described below used in the production of an insulation which was applied to a wire. In this example it will be noted that the concentration of the Vulkanox ZMB-2 was reduced still further below that in the ID 80-90B and 90 C and specifically down to a concentration of ½ part of the Vulkanox ZMB-2. Nevertheless, very substantial improvement in tensile strength is observed with reference to the control sample 1852 -19-07. Also, substantial decrease in the elongation is found where the ID 80-90D sample is compared with the same control of Table II. Further, a substantial increase in the 200% modulus was achieved although the concentration of the Vulkanox ZMB-2 was at the relatively low level used and listed in the example ID 80-90D. In fact, the choice of the composition of the sample ID 80-90D was made based on the overall combination of properties of the composition and was not made based on only the tensile strength, or only the elongation, or only on any other single one of the properties. The value of the tear resistant property was influential in the choice which was made inasmuch as it is desirable to have favorable tear resistant properties and higher tear resistant properties are generally favorable. In this regard it is noted that the reduction in tear resistant properties is smallest for the ID 80-90D example of Table II when comparison is made with the tear resistant properties of the control 1852 -19-07.

Considering next the examples and the technical data which is assembled at Table II, here again there was a repetition for the purpose of experimental verification and control of two of the examples which are given above in Table I. The first is the control 1852 -19-07. The second is the ID 80-87C. The identity of these two runs with respect to the runs listed in Table I, Table II and Table III are self-evident from a comparison of the content of the three Tables.

TABLE III

| | 1852 -19-07 Parts | ID80 -87C Parts | ID80 -96A Parts | ID80 -96B Parts |
|---|---|---|---|---|
| Ethylene-propylene copolymer Exxon, Vistalon 404 | 50. | 50. | 50. | 50. |
| Ethylene-propylene-diene-terpolymer du Pont, Nordel 1040 | 50. | 50. | 50. | 50. |
| Talc-hydrated magnesium silicate Sierra Talc, Mistron Vapor | 76. | 76. | 76. | 76. |
| Vinyl Silane | .77 | .77 | .77 | .77 |
| Thermal Carbon Black R. T. Vanderbilt, Thermax(N991)Black | 30.4 | 30.4 | 30.4 | 30.4 |
| Reaction product of acetone and diphenylamine, Uniroyal, B.L.E. -25 | 2. | 1. | 1. | 1. |
| Zinc salt of 2-mercaptotolylimidazole Mobay, Vulkanox ZMB-2 | — | 2. | 2. | — |
| Zinc salt of 2 mercaptotolylimidazole | — | — | — | 2. |

TABLE III-continued

| | 1852 -19-07 Parts | ID80 -87C Parts | ID80 -96A Parts | ID80 -96B Parts |
|---|---|---|---|---|
| Vanderbilt, Vanox ZMTI | | | | |
| Chlorosulfonated polyethylene du Pont, Hypalon 40 | 5. | 5. | 5. | 5. |
| Antimony Trioxide | 5. | 5. | 5. | 5. |
| Zinc Oxide | 20.8 | 20.8 | 20.8 | 20.8 |
| Dicumyl peroxide curing agent 90-93% active Hercules, Di Cup T | 4.52 | — | — | — |
| Dicumyl peroxide curing agent 98-100% active Hercules, Di Cup R | — | 4.71 | 4.28 | 4.28 |
| Polybutadiene homopolymer Colorado Specialties, Ricon 150 | 3. | 3. | 3. | 3. |
| Press Cure: 45 min. @ 350° F. | | | | |
| Tensile Strength, lbs/in. | 860 | 1281 | 1176 | 1228 |
| Elongation, % | 746 | 335 | 333 | 327 |
| 200% Modulus, lbs/in. | 488 | 1052 | 1003 | 1044 |

Turning next to the example ID 80-96A, in this example the test of ID 80-87C is repeated in essence with the small variation in the Di Cup R component as has been discussed above. Otherwise the compositions are essentially identical.

Lastly and significantly, the example ID 80-96B has a composition which matches that of ID 80-96A with the exception that the Vulkanox ZMB-2 of example ID 80-96A is absent from ID 80-96B but the Vanox ZMTI antioxidant component is present in example ID 80-96B is an amount which is equivalent to the amount of Vulkanox ZMB-2 present in ID 80-96A.

Again by comparison of the results obtained there is a significant reaffirmation of the improvement n the test values for tensile strength, elongation and modulus properties based on the repetition of these respective tests and comparison of the values with those for the control sample 1852 -19-07 of Table III. Further in Table III there is reported the repetition and confirmation of the results for example ID 80-87C as listed in Tables I and II.

These two examples 1852 -19-07 and ID 80-87C, are repeated as part of the sets of tests conducted and reported in each of the three tables and the three independent confirmatory tests appear in each of the three tables. Because of the similarity of values obtained in each of the three 1852 -19-07 examples and the similarity of values obtained in the ID 80-87C examples coupled with the substantial differences between values for the 1852 control and the repeated 80-87C test example the validity of the improvements obtained by the combination and addition of Vulkanox ZMB-2 antioxidant material is verified and by the combination of the Vanox ZMTI, each of which materials is a zinc salt of 2-mercaptotolylimidazole.

The significance of 96B test is that it confirms that the improved results obtained in the data of Tables I and II is not limited to the employment of the Vulkanox ZMB-2 alone in the composition which is prepared, but is tied to and dependent on the use of a zinc salt of 2-mercaptotolylimidazole.

Considering next the pertinency and relevancy of the discovery of the uniquely beneficial effect of the addition of even small amounts of the combination of antioxidant compounds, zinc salt of 2 mercaptotolylimidazole such as Vulkanox ZMB-2, and the amine antioxidant such as B.L.E. -25 to the compositions as recited in the tables, the compositions and particularly that of example ID 80-90A, were employed in preparing insulated wire samples. In general, the data obtained from the platen cured materials as recited in the tables do not correspond, value for value, to the values of data obtained from compositions formed and deposited on wire. However, it has been found that the beneficial effects which are evident from the study and comparison of the platen sample data of Tables I, II and III are available and are present in the cable samples which are prepared with these compositions and particularly with the selected composition of test example ID 80-90D.

As has been indicated previously, the compositions of the present invention are improvements over those previously known. The results achieved in preparing the novel compositions and in curing and testing them are drawn from the laboratory preparation, cure and test of platen samples performed with the objective in developing the new compound not only to provide the novel cured compound itself and the novel precured composition, but also to formulate the material for application to wire as the insulation therefor.

Prior art compositions similar to that of the control composition of Tables I, II and III have been known and have been used in the past for a number of years. Such prior art composition was known and is shown in the tables with the identification 1852 -19-07. A sample of such prior art composition was applied to a cable and the composition was cured on the cable by subjecting the composition and cable to a steam atmosphere at an elevated temperature. Generally the steam pressure for cure of such prior art compositions on cable is between about 225 to 250 psig. Saturated steam, such as may be used in curing such a composition on a wire or cable would have a temperature of 395° F. with a pressure of 220 psig. Alternatively, saturated steam at a temperature of 406° F. and having a pressure of 250 psig may be used. Using a prior art composition illustrated by the 1852 -19-07 composition of Tables I, II and III and using a steam curing procedure in the temperature and pressure range recited above, a cured insulation was prepared on a cable.

The particular cable is American Wire Gauge size No. 2/0 AWG. The conductor was stranded tinned copper and there were 325 strands each having a diameter of 0.0201 inches. An insulation wall thickness of approx. 0.155 inches was deposited and steam cured in the conductor. This construction was the construction for both a prior art composition according to sample 1852 -19-07 and was also the construction for a sample identified as T1852 -19-07C. This latter composition is the same as the composition identified in Table III as ID 80-90D.

Subsequent to its preparation of the prior art cable the insulation was stripped from the cable so that test samples could be prepared to study the physical properties of the insulation. The test samples were prepared in the conventional manner known in the polymer testing art and the following results were obtained using the prior art composition. The tensile strength based on measuring five samples was 675 psi. Elongation again based on the use of five samples was 819%. A tensile stress at 200% elongation, also known as 200% modulus, based on a test of five samples was 425 psi. Tear resistance of this cured prior art composition was tested on six samples and on an average tear resistance of 37.83 pounds per inch was found. The test used is the ASTM D470 tear resistance test.

For an insulated cable prepared from the ID 80-90D composition, extruded onto conductor and steam cured as described above, followed by stripping and testing of the cured insulation the following physical properties were found: the tensile strength was 828 psi, elongation was 881%, the 200% modulus was 502 psi, each value being based on measurement of three samples.

Tear resistance measurements were made on six samples and an average tear resistance of 35.9 lbs/in. was found. The cable was tested for dielectric breakdown and a value of over 58 kv was found.

The properties of the insulation of a second prior art cable were compared with those of a cable insulation formed with the preferred composition of sample ID 80-90D of Table II above. The cable construction for each cable was one for a 2 AWG made up of nineteen 7 strand bundles, each strand of which had a diameter of 0.0223 inches. An insulation wall thickness of approx. 0.155 inches was formed and steam cured. The outside diameter was 0.670 inches for the prior art cable and 0.683 inches for the novel cable of this invention.

The tensile strength of the prior art insulation was found to be 662 psi and the percent elongation was 876 based on five test samples. The 200% modulus was 400, psi again based on five test samples. A tear resistance of 35.88 psi was found based on a measurement of six samples.

A comparable cable was prepared insulated with the ID 80-90D composition. The cable was a 2 AWG having nineteen 7 strand bundles each strand of which had a diameter of 0.0223 inches. The insulation thickness was approx. 0.155 inches and the insulation was steam cured following extrusion of the insulating wall onto the cable.

On stripping of the cured insulation and measurement of its properties in the conventional manner it was found that the tensile strength was 818 psi and the percent elongation was 905 based on a test of three samples. Also the 200% modulus was 475 psi based on a test of three samples. A tear resistance of 33.8 lbs. per inch was found based on a test of six samples.

The cables prepared pursuant to this invention were found to have acceptably apt electrical properties at least as good as those of prior art cables but having a combination of significantly superior physical properties as set forth above.

For most prior art and other cable constructions it is frequently desirable and often mandatory to include a film or strip of separator between the stranded conductor and the deposited outer layer of insulation. A strip of Mylar having a thickness of about 2 mils was employed as a separator on the cable products described herein. The electrical properties of the cable reported above are based on a cable made with the Mylar ribbon separator.

Referring to the drawing, there is shown a typical construction for an insulated electrical wire or cable product 10, comprising a metallic conductive element 12 and an overlying body of cured elastomeric insulation 14 extending thereabout or covering the conductor. In the drawing, the product 10 is illustrated as a short section with the insulation 14 removed from the end portion of the conductor 12. According to one embodiment of this invention, the novel ethylene-propylene rubber composition thereof can be used to provide or form the insulation 14 on a conductor 12 of wire or cable product 10. it is to be understood from the foregoing, however, that the insulation can comprise a coating on any portion of a conductive element and that the insulation need not completely enclose the element where such is not necessary for a desired insulative effect.

Although the invention has been described with reference to certain specific embodiments thereof, numerous modifications are possible and it is desired to cover all modifications falling within the spirit and scope of this invention.

What I claim and desire to secure by Letters Patent of the United States is:

1. A curable ethylene-propylene rubber composition having improved tensile and related physical properties, resistance to heat and apt electrical and physical properties, consisting essentially of the combination in approximate parts by weight of:

| | |
|---|---|
| Ethylene-propylene rubber | 100 |
| Chlorosulfonated polyethylene | 3–10 |
| Zinc Oxide | 15–30 |
| Talc | 50–125 |
| Vinyl silane | 0.5–3 |
| Carbon black | 10–32 |
| Antimony oxide | 3–10 |
| Amine antioxidant | 1–4 |
| Imidazole antioxidant | 0.2–4 |
| Peroxide curing agent | 2–8 |
| Curing coagent | 2–5 |

2. The crosslink cured product of the ethylene-propylene rubber composition of claim 1.

3. A cable insulated with the cured product of claim 2.

4. A curable eethylene-propylene rubber composition having improved tensile and related physical properties, resistance to heat and apt electrical and physical properties, consisting essentially of the combination in approximate parts by weight of:

| | |
|---|---|
| Ethylene-propylene rubber | 100 |
| Chlorosulfonated polyethylene | 3–10 |
| Zinc Oxide | 15–30 |
| Talc | 50–125 |
| Vinyl silane | 0.5–3 |
| Carbon black | 10–32 |
| Antimony trioxide | 3–10 |
| Amine antioxidant | 1–4 |
| Imidazole antioxidant | 0.2–4 |
| Dicumyl peroxide curing agent | 2–8 |
| Curing coagent | 2–5 |

5. The crosslink cured product of the ethylene-propylene rubber composition of claim 4.

6. A cable insulated with the cured composition of claim 5.

* * * * *